(12) United States Patent
Last

(10) Patent No.: US 10,842,282 B2
(45) Date of Patent: Nov. 24, 2020

(54) ROTATION DRIVEN FOOTREST TRANSLATION

(71) Applicant: Textron Aviation Inc, Wichita, KS (US)

(72) Inventor: Brent William Last, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 16/426,135

(22) Filed: May 30, 2019

(65) Prior Publication Data

US 2019/0365107 A1 Dec. 5, 2019

Related U.S. Application Data

(60) Provisional application No. 62/678,366, filed on May 31, 2018.

(51) Int. Cl.
| | | |
|---|---|---|
| B60N 3/06 | (2006.01) | |
| A47C 7/50 | (2006.01) | |
| A47C 1/022 | (2006.01) | |

(52) U.S. Cl.
CPC ............ *A47C 7/5068* (2018.08); *A47C 1/022* (2013.01); *A47C 7/5062* (2018.08); *A47B 2220/0069* (2013.01)

(58) Field of Classification Search
CPC .......... A47B 2220/0069; A47C 7/5062; A47C 7/5068; A47C 7/5069; A47C 1/022; B60N 2/995; B60N 3/063; B64D 11/0643; B64D 11/0649

USPC ............. 297/423.24, 423.25, 423.26, 423.7, 297/423.28, 423.3
See application file for complete search history.

(56) References Cited

U.S. PATENT DOCUMENTS

| | | | | |
|---|---|---|---|---|
| 156,004 | A * | 10/1874 | Wayland ................... | A61G 5/12 |
| | | | | 297/423.3 |
| 4,336,965 | A | 6/1982 | Lipp | |
| 6,267,445 | B1 * | 7/2001 | Marais ................... | B60N 2/995 |
| | | | | 297/423.36 |
| 6,959,966 | B2 * | 11/2005 | Kristen ................... | A47C 7/506 |
| | | | | 297/423.26 |
| 7,121,627 | B2 | 10/2006 | Gaikwad et al. | |
| 7,429,083 | B2 * | 9/2008 | Tsuji ....................... | B60N 2/995 |
| | | | | 297/423.26 |
| 7,918,496 | B2 * | 4/2011 | Mackert ............... | A47C 1/0352 |
| | | | | 297/423.28 |
| 8,444,226 | B2 * | 5/2013 | Driessen ................ | B60N 3/063 |
| | | | | 297/423.28 |
| 9,192,239 | B2 * | 11/2015 | Besler ................... | A47C 1/0355 |
| 9,499,079 | B2 * | 11/2016 | Meister .............. | B64D 11/0648 |
| 2006/0103218 | A1 * | 5/2006 | De Vroe ................. | A47C 1/035 |
| | | | | 297/423.26 |

(Continued)

*Primary Examiner* — Rodney B White
(74) *Attorney, Agent, or Firm* — Erise IP, P.A.

(57) ABSTRACT

A footrest system is disclosed. The footrest cushion is supported by a frame that is hinge-mounted onto the front of a chair frame. The rotation of the footrest frame by a user creates, through a mechanical system, rotation in a spool. The spool is wound with first and second lines, each being wound in the reverse direction as the other. The lines are connected through rerouting systems and then anchored to the translating member such that they pull the member out upon a deployment, and return the member back in when the footrest is retracted.

15 Claims, 14 Drawing Sheets

(56) References Cited

U.S. PATENT DOCUMENTS

| | | | | |
|---|---|---|---|---|
| 2012/0091779 A1* | 4/2012 | Chang | ............... | B60N 2/995 |
| | | | | 297/423.3 |
| 2013/0045824 A1* | 2/2013 | Yin | ............... | B60N 2/995 |
| | | | | 474/148 |
| 2013/0045825 A1* | 2/2013 | Yin | ............... | B60N 2/62 |
| | | | | 474/150 |
| 2015/0284092 A1* | 10/2015 | Wilkey | ............ | B64D 11/0643 |
| | | | | 297/423.29 |
| 2015/0375865 A1* | 12/2015 | Fischer | ............ | B60N 2/77 |
| | | | | 701/49 |
| 2020/0130846 A1* | 4/2020 | Mayne | ............ | B64D 11/0643 |

* cited by examiner

ROTATION DRIVEN FOOTREST TRANSLATION

RELATED APPLICATIONS

This application is a non-provisional application which claims priority to U.S. Provisional Patent Application No. 62/678,366, filed May 31, 2018, the disclosure of which is incorporated herein by reference.

BACKGROUND

1. Field disclosed embodiments relate generally to the field of seating technologies. More specifically, the embodiments relate to aircraft seating, the kind having footrests.

2. Related Art

Footrest arrangements for chairs are known. For example, U.S. Pat. No. 7,212,627 issued to Gaikwad et al. discloses a footrest that telescopically extends and retracts. U.S. Pat. No. 4,336,965 issued to Lipp discloses an expandable leg rest for dental chairs which also includes an extension that is telescopically nested within the leg rest.

SUMMARY

In embodiments, the disclosures include a footrest attached to the front of a chair using a hinge arrangement. The footrest can include a hinge arrangement including at least one rotating collar on one of the chair or the footrest that rotates about an axle located on the other of the chair and footrest. Also included is a mechanical linking system connected to the rotating collar, the linking system imparting rotation into a spool in a first imparted angular rotation direction when the footrest is pushed down towards a retracted position, the linking system imparting rotation into the spool in a second angular direction when the footrest is raised up towards a deployed position. The system uses two cables, a first cable wound in a first direction onto the spool; and a second cable wound onto the spool in a second direction, the second direction being opposite of the first direction such that the second cable releases in substantially the same amount when the first cable retracts. The first cable can be connected to a first location of a translational member, the second cable can be connected to a second location on the translational member such that when the footrest is deployed the translational member extends outward, and when the footrest is retracted, the translational member is drawn inward.

A first circumferential groove being formed into an outer surface of the spool to a first depth; and a second circumferential groove formed into the outer surface of the spool at a second depth, the first cable being received into the first groove; the second cable being received into the second groove; and the depths for each of the first and second grooves being established such that they each are at substantially equal radial distances from a center axis of the spool. In embodiments, the first cable and second cable are configured to move the translational member inward and outward using at least one cable-redirecting subsystem. In embodiments, the cable-redirecting system incorporates a plurality of redirecting pulleys. In further embodiments, a second cable-redirecting system operates with the second cable. In further embodiments, each of the first and second cable-redirecting systems incorporate pulleys to redirect the first and second cables through spaces existing between obstacles. In further embodiments, the first cable-redirecting system is configured to cause the first cable to pull the translational member while the second cable is slacked to allow the translation.

In yet further embodiments, a frame member which includes at least one collar supports the extension member, the extension member being configured to be translatable relative to the frame member. Also, the extension member can support a cushion member, where the cushion member is positioned to support a portion of a leg of a user.

In further embodiments, there is a pair of aligned spaced-apart collars, and the axle is fixed to a frame portion of the chair, and thus, made to be immobile relative to the chair, and the at least one collar supports a footrest frame member which rotates relative to the chair. The footrest frame member, in embodiments, supports the translatable member, the translatable member and footrest frame member being configured such that the translatable member moves substantially in parallel relative to the footrest frame member. In further embodiments the translatable member is located on top of the footrest frame member, and the translatable member supports a cushion. The translatable member slide direction can be dictated by opposing guide members, and in embodiments, the opposing guide members comprise guide bearings.

In some embodiments, the mechanical linking system includes a linking member driven by at least one outwardly-extending prong on the collar, the prong rotating along with the collar and pulling on a linking arm, the linking arm, as a result pulling tangentially on a sprocket, the rotation of the sprocket resulting in the driving of a timing belt, the belt imparting rotation to the spool.

The system can alternatively include: (i) a footrest frame pivotally mounted on an axis on a chair; (ii) a mechanical linking system between the footrest frame and a spool, the spool being wound with a first line and a second line, the first line being wound in a direction opposite of the second line; and (iii) the first and second lines being connected to a translatable member in different directions such that a translatable member moves out when the footrest is deployed and is pulled back in when the footrest is retracted. In further embodiments of this version both the first and second lines are reverse wound onto the spool at substantially the same radius from the center axis of rotation of the spool such that during an unwinding of the first line the second line is substantially equally retracted, and upon an unwinding of the second line, the first line is substantially equally retracted.

BRIEF DESCRIPTION OF THE DRAWINGS

Illustrative embodiments are described in detail below with reference to the attached drawing figures, which are incorporated by reference herein and wherein.

DETAILED DESCRIPTION

Figure 1:
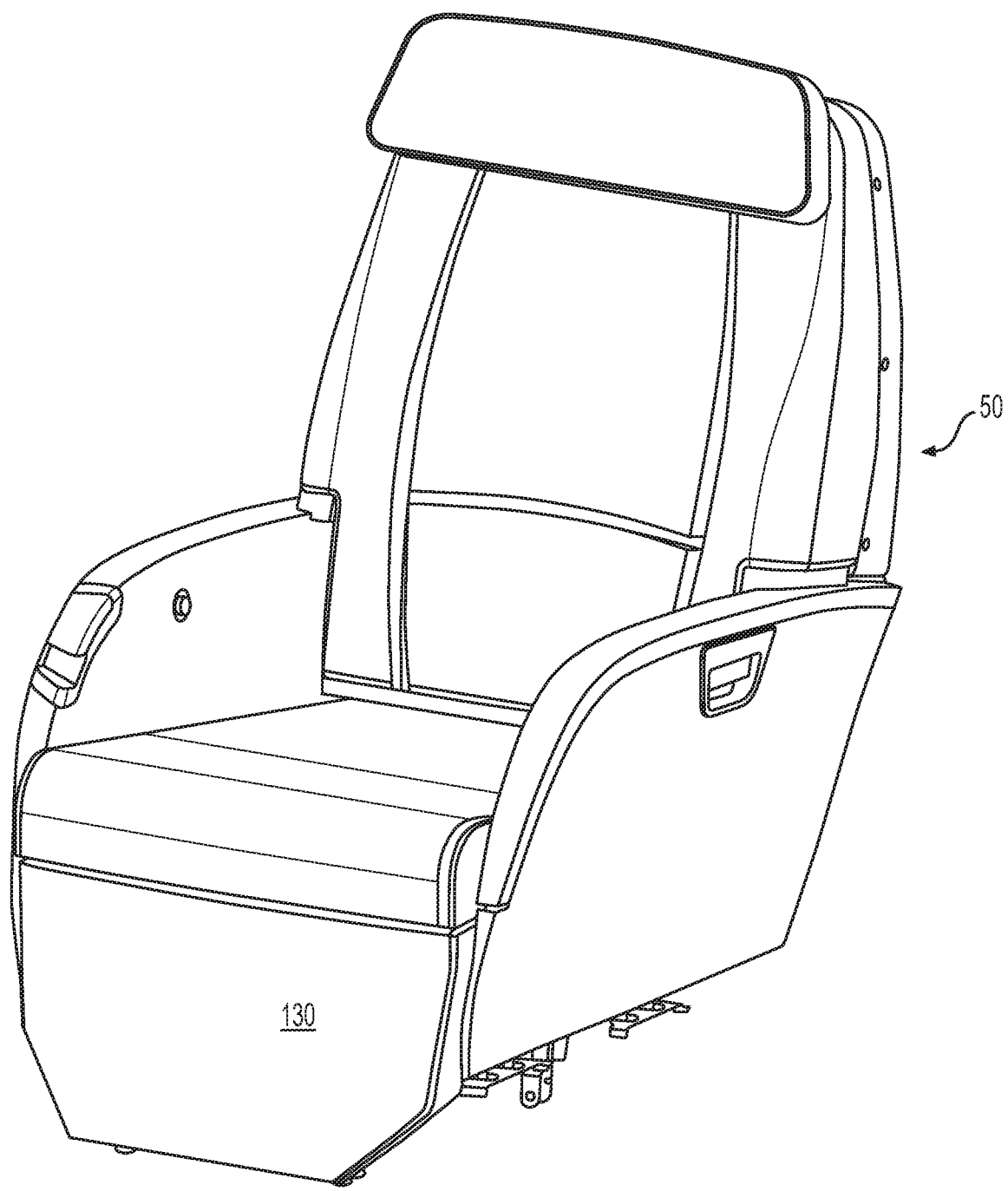
FIG. 1 is a perspective view of an embodiment of the chair in which the systems disclosed herein are incorporated.
Figure 4:
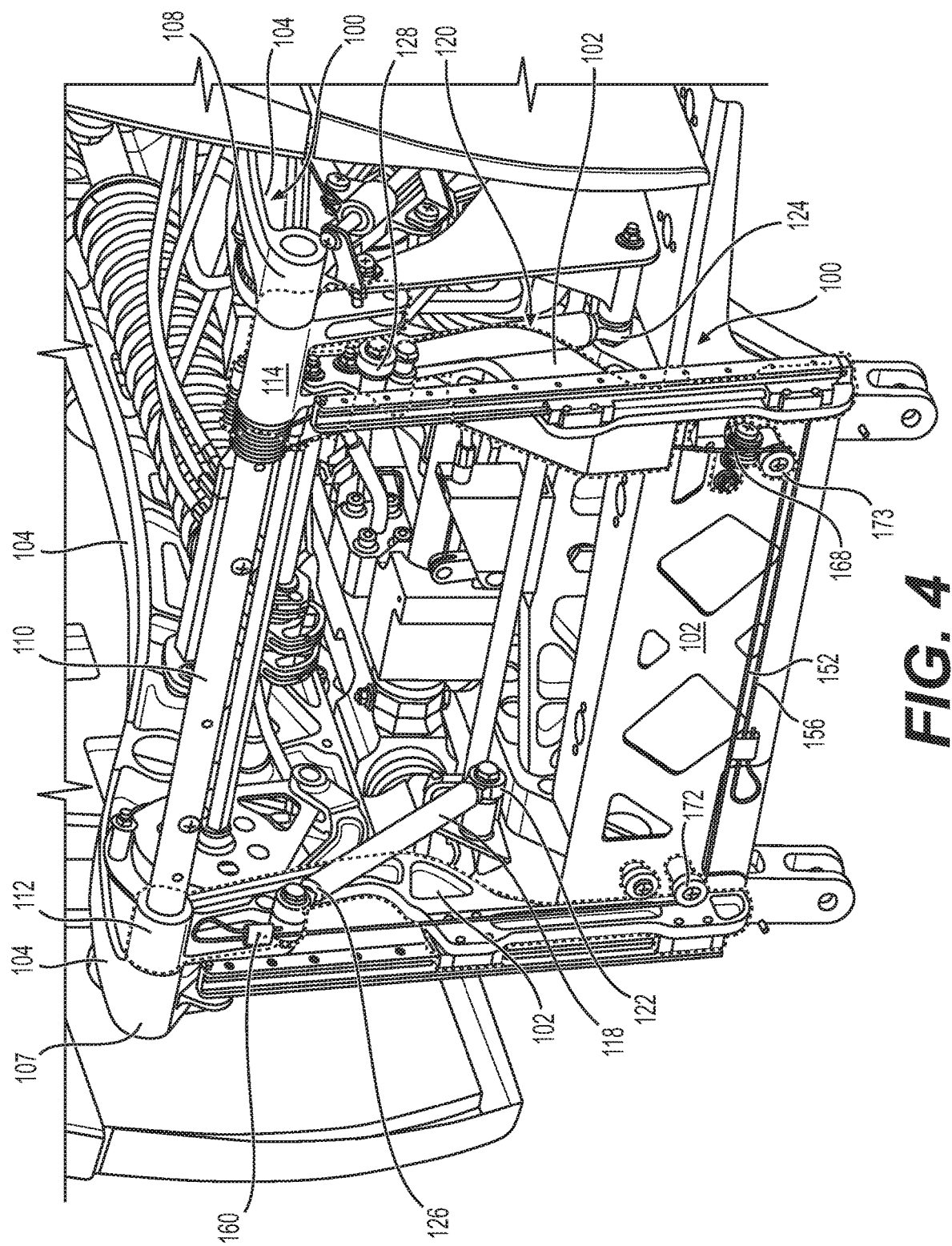
FIG. 4 is a closeup view of the chair wherein the extendable member is removed to reveal internals.
Figure 5:
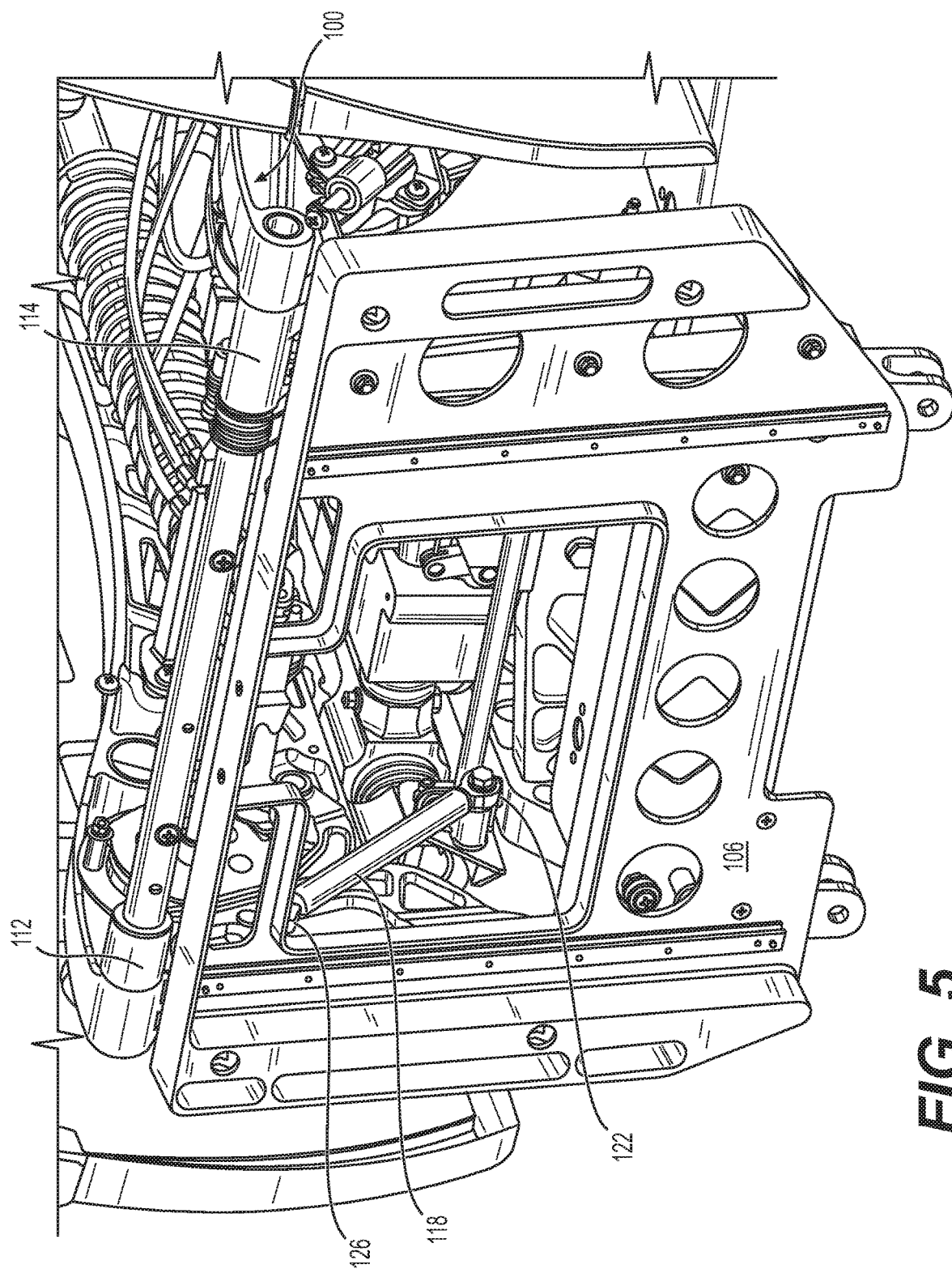
FIG. 5 is the same view as in FIG. 4 except that the extendable member 106 is still in place.
Figure 6:
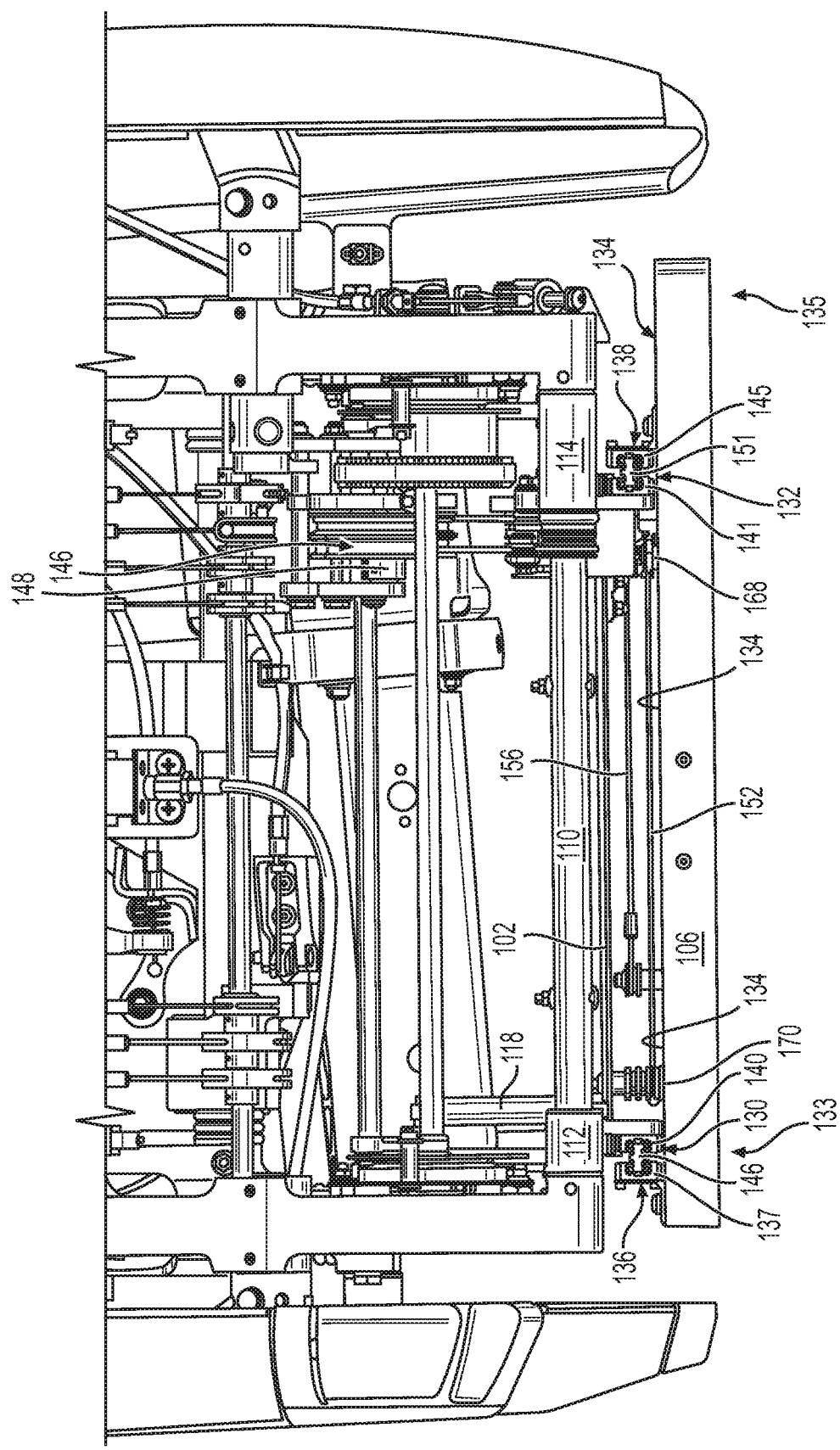
FIG. 6 is a top view of what is shown in FIG. 5.
Figure 7:
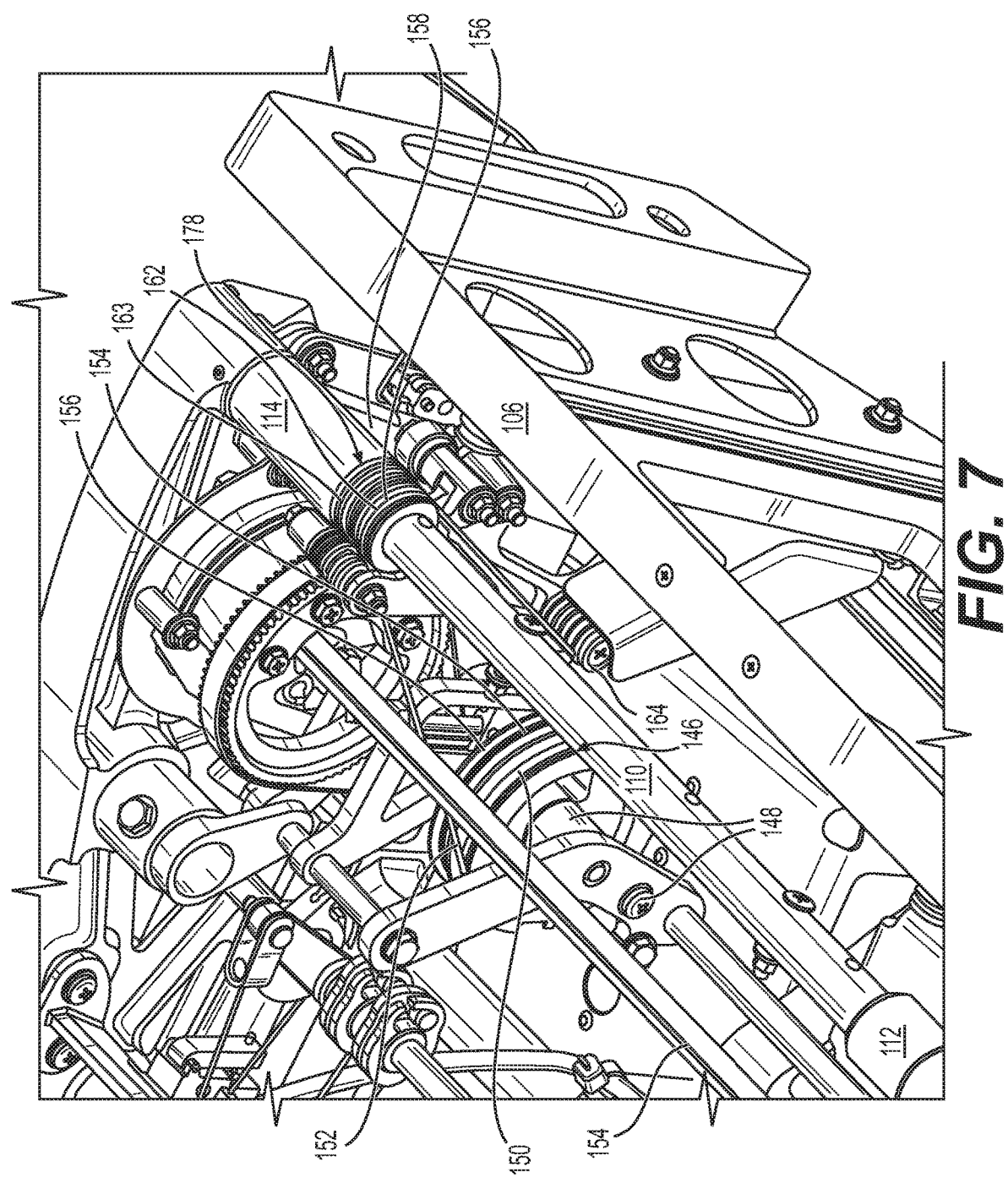
FIG. 7 is a view from the top and down from the left of the top of the footrest system.

Disclosed is a system for supporting a footrest on a seat, e.g., in an aircraft. An embodiment can be seen in FIGS. 1-14. As can be seen in FIG. 1, a chair 50 includes a cushioned footrest 130. Referring to FIG. 4, a stationary chair seat frame 100 is intended to be in fixed relation to an aircraft floor.

The footrest is extended on an axis of rotation. When it rotates, the rotation is used to drive translation outward, and then on retraction, the footrest is translated in. To do this, two cables are reverse wound on a spool. Thus, when a user releases the footrest from the down position, the footrest extends up (due to gas springs), but this action also causes the first cable 152 to be put into tension. This tension causes the length of the first cable 152 to converge and pull inward. The convergence pulls on a fixed point on the back side of the second translating member pulling it out. When a user pushes down on the footrest (overcoming the force imparted by the gas springs) to take it out of use, the reverse-spooled second cable 156 is simultaneously drawn in as the cable 152 is extended. Cable 156 is anchored to the front of the translated member and looped around a fixed pully. Thus, retraction of the cable 156 translates the footrest back into stowed position. Thus, inward and outward translation of the extension member 106 are enabled by the spool and cables during operation.

Figure 2:
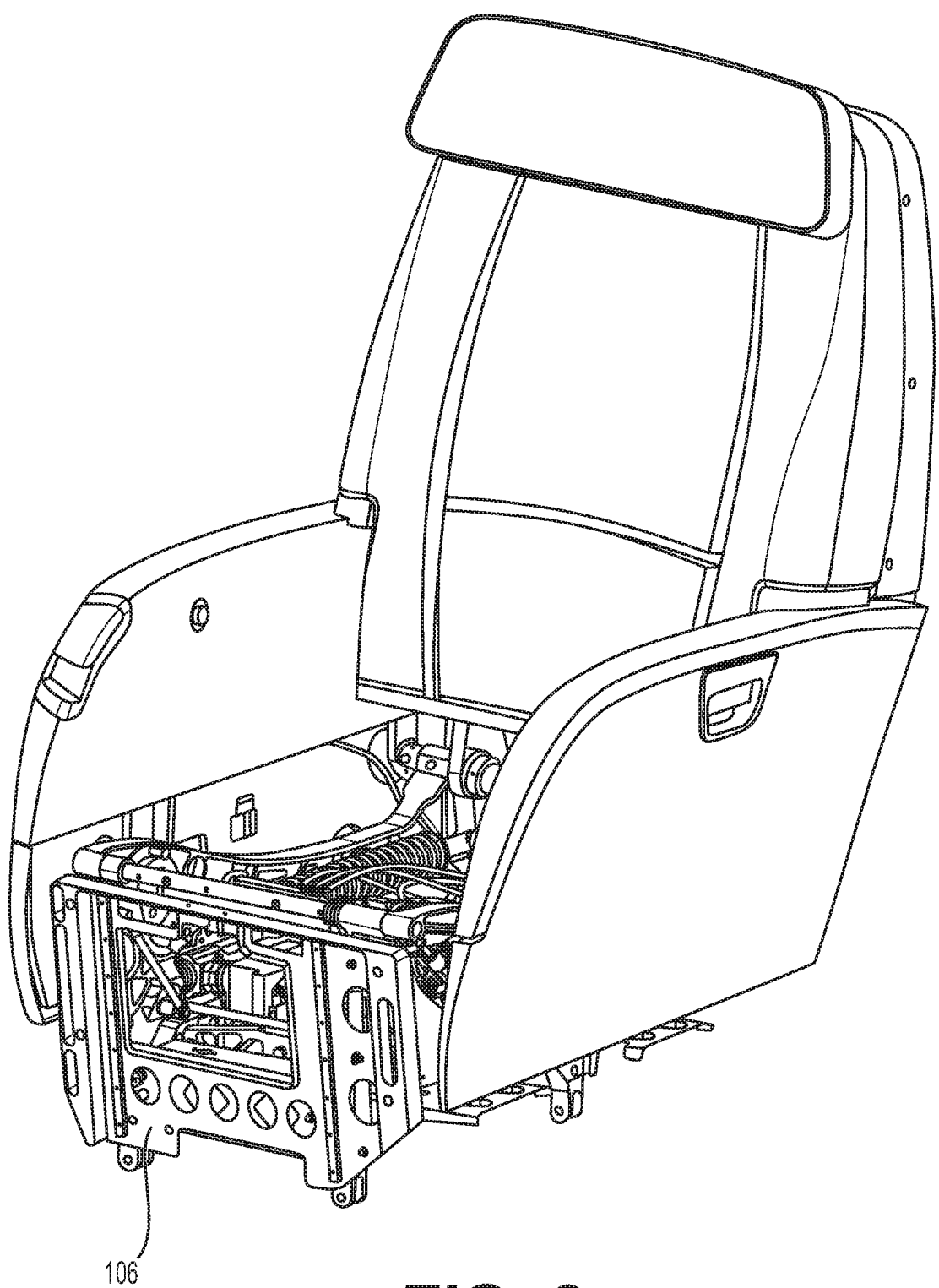
FIG. 2 is the same perspective view of the same chair with the cushion removed.
Figure 3:
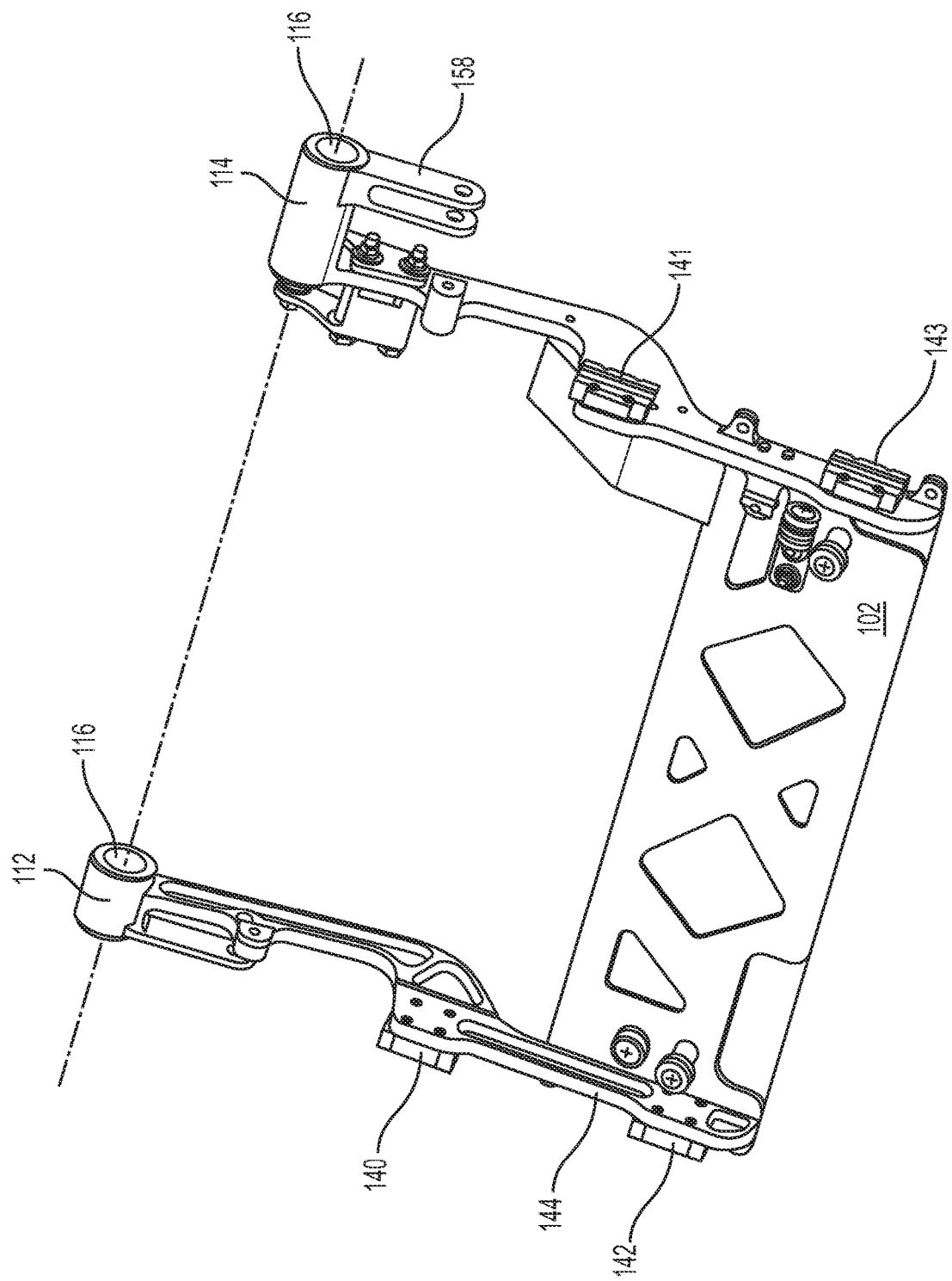
FIG. 3 is a view of a removed footrest frame which is, when utilized, pivotally mounted to the chair frame.

The system includes a footrest that is pivotally mounted. FIG. 2 shows the chair front with the extension member 106, whereas FIG. 4 shows the same front with member 106 removed so that the details of the system can be seen. Referring to FIG. 4, a frame system 100 can be seen. The chair frame 100 supports (at a forward location) a forwardly extending footrest support member 102. Footrest support member 102 is hingably attached to the front of the seat area onto opposing lateral portions 104 of the frame 100. Referring to FIG. 4, cylindrical recesses formed in opposing couplers 107 and 108 (at the front of the lateral portions 104) receive each end of, and fixedly secure a primary axle 110. The hinged relationship between the support member 102 and the frame 100 is created using transverse collars 112 and 114 on the hinged side of the footrest support member 102. Collars 112 and 114, together, define a transverse cylindrical receiving area 116 for the axle 110. Installation is accomplished by passing axle 110 through one of the couplers (106 or 108), then through both of the collars 112 and 114, then through the second of the couplers. The axle 110 is then fixed to one or both of the fixed couplers 107 and 108 so that it is secured and immobile relative to the frame 100. The footrest support member, 102, however, is allowed to pivot on the collars 112 and 114 about the axle 110, this creating the hinged relationship.

The natural state of the footrest is made to be in a deployed state. This is done using a gas-biasing subsystem. Referring to FIG. 4, tandem gas springs 118 and 120 are each secured at pivotal mount points 122 and 124 at lower portions of the frame 100, and then to second pivotal mount points 126 and 128 on the underside of the support member 102. Gas springs 118 and 120 are under compression. Both springs are over-center (see e.g., spring 120 in FIG. 8) of the axis of rotation (axle 110), thus, they will compel the support member 102 up and out around axle 110 unless some opposing force is met. Thus, because of gas springs 118 and 120 the ordinary state of the footrest is to be deployed. A latch (not shown) associated with a conventional handle release arrangement (also not shown) enable the footrest to be released when the side handle shown in FIGS. 1, 2, 10, 11, and 13 is pulled (in a known manner). To be re-stowed, the user simply pushes down with his or her legs to return the footrest to the stowed position where it can be latched. This sort of latching system is known in the art. Although two gas springs are included in the embodiment depicted, it is possible that one, three, or really any number could be used.

An extension member 106 is used to support a cushion 130 (see FIG. 1 which shows the cushion, and FIG. 2 which shows the same arrangement with the cushion removed) and is translatable out and in relative to the support member 102. As will be discussed later, this extension out will occur when the footrest is deployed to support a user's feet. The translation relative to the support member 102 is established using opposed guide bearing pairs 130 and 132. In embodiments, guiding bearing arrangements 130 and 132 could be simple plain guiding bearings. In other embodiments, roller bearings could be used. Alternatively, other sorts of bearings, e.g., ball or roller bearings, could be used. Each arrangement (130 and 132) is comprised of two opposing bearing sets.

Arrangement 130 on a first side of the footrest 133 (see FIG. 6) includes a first pair of inwardly facing bearing sets 137 (FIG. 6) and 139 (not shown in FIG. 6, but would be behind set 137) are secured to the backside 134 of the extending member 106 using an elongated L-bracket 136. An outwardly-facing opposing bearing sets 140 and 142 are mounted on the outside of a lateral support portion 144 of the support member 102. The outwardly-facing sets 140 and 142 are located opposite each of the corresponding inwardly facing sets 137 and 139. A first glide member 149 floats between the opposing bearing pairs 130 and 132. Each end of the glide member 149 has limiting screws (not shown) which eventually bottom out when engaging the outsides of bearing blocks 137, 139, 140, and 142 to retain the extension member and terminate the extent of its translation out.

In arrangement 132 on a second side of the footrest 135, a second glide member 151 floats between opposed guide bearing pairs (comprising bearings 141, 143, 145, and 147 (not shown) enabling the extension of the member 106 out and in a parallel plane relative to the support member 102. Arrangement 132 is substantially identical structurally and functionally to arrangement 130 (e.g., limiting screws, etc.).

The system uses a reverse-wound spool to extend the support for the footrest out on deployment, and in upon retraction. To do this, the system utilizes the rotation of the support member 102. The spool 146 is located on a spool axis 148 which is a distance from, but parallel to the axis of rotation of the support member 102. A first channel 150 is configured to receive a first cable (line) 152, and then a second channel 154, is configured to receive a second line 156. The innermost point in each of the channels 150 and 154 are at equal radii. The first line 152 is wrapped in an opposite direction relative to the spool. More specifically, the first line 152 is wrapped as the spool travels in a counter clockwise direction, whereas the second line 156 is wrapped when the spool rotates in a clockwise direction. Thus, the two lines are reverse wrapped, and because each line is equidistant from the center of the spool axis 148, one line is wound at the same rate as the other line is unwound.

Figure 9:
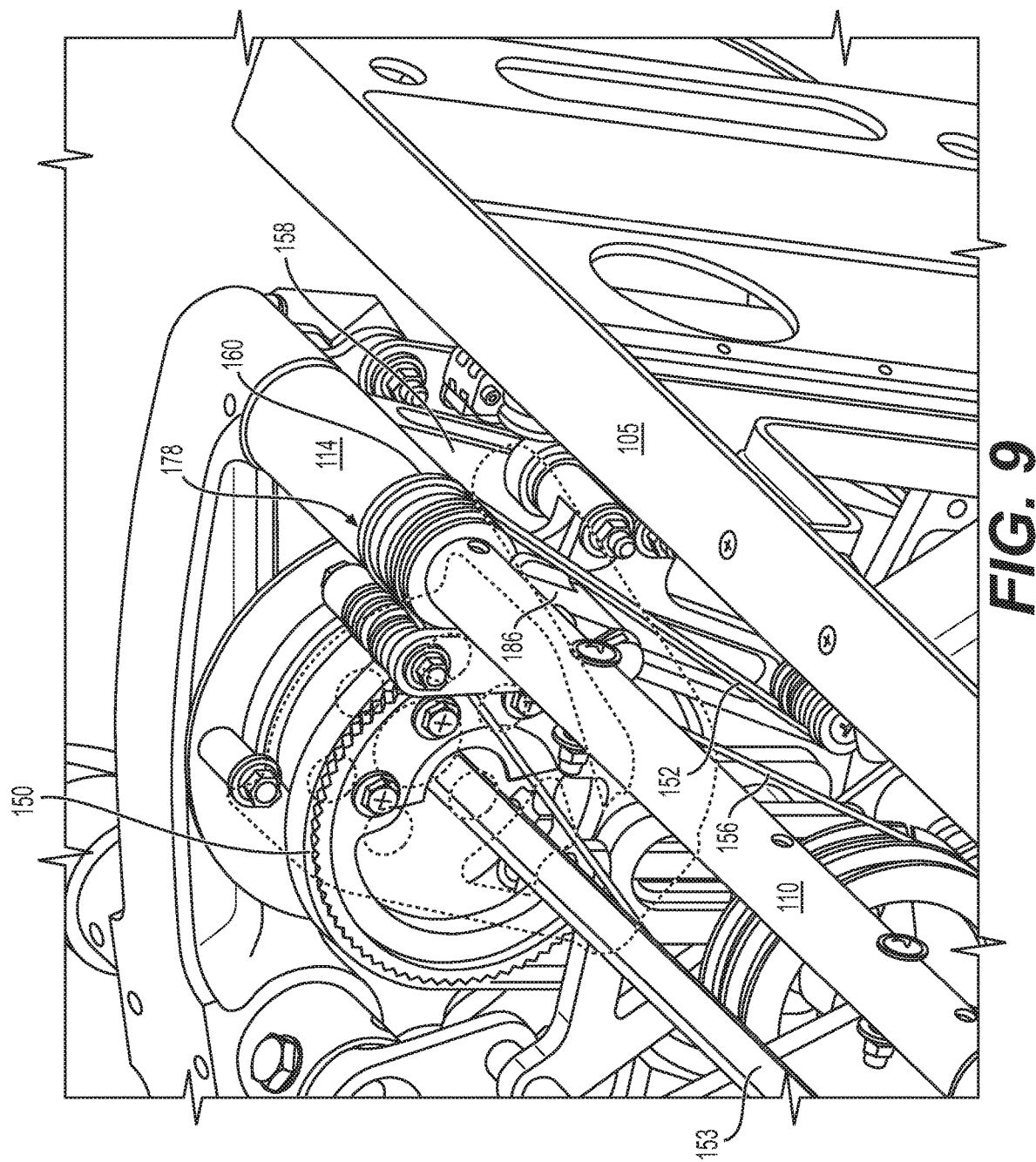
FIG. 9 is a top down view of the right hand side of the chair/footrest assembly.
Figure 10:
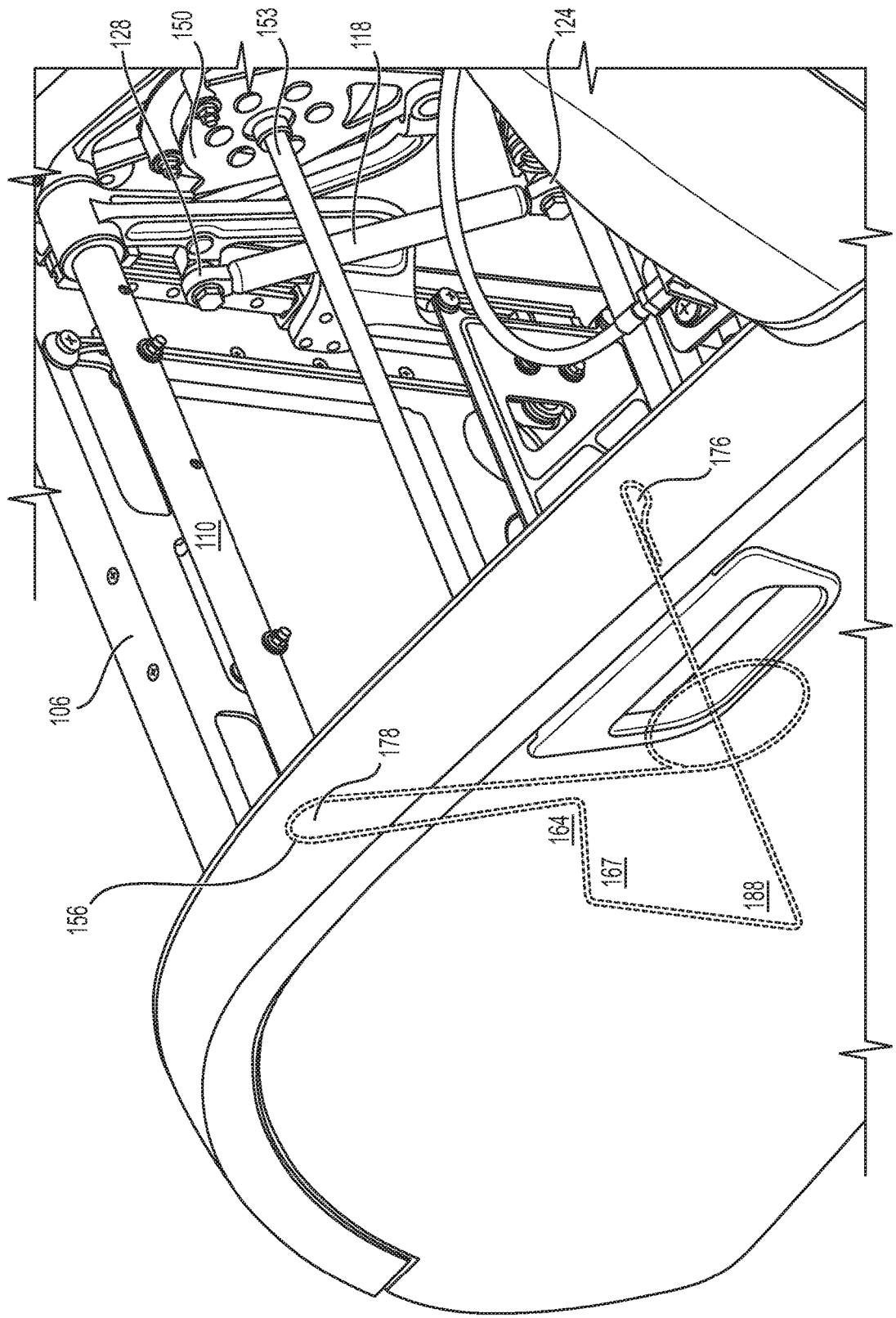
FIG. 10 is a view of the chair wherein the travel details for the second cable 156 are revealed.
Figure 11:
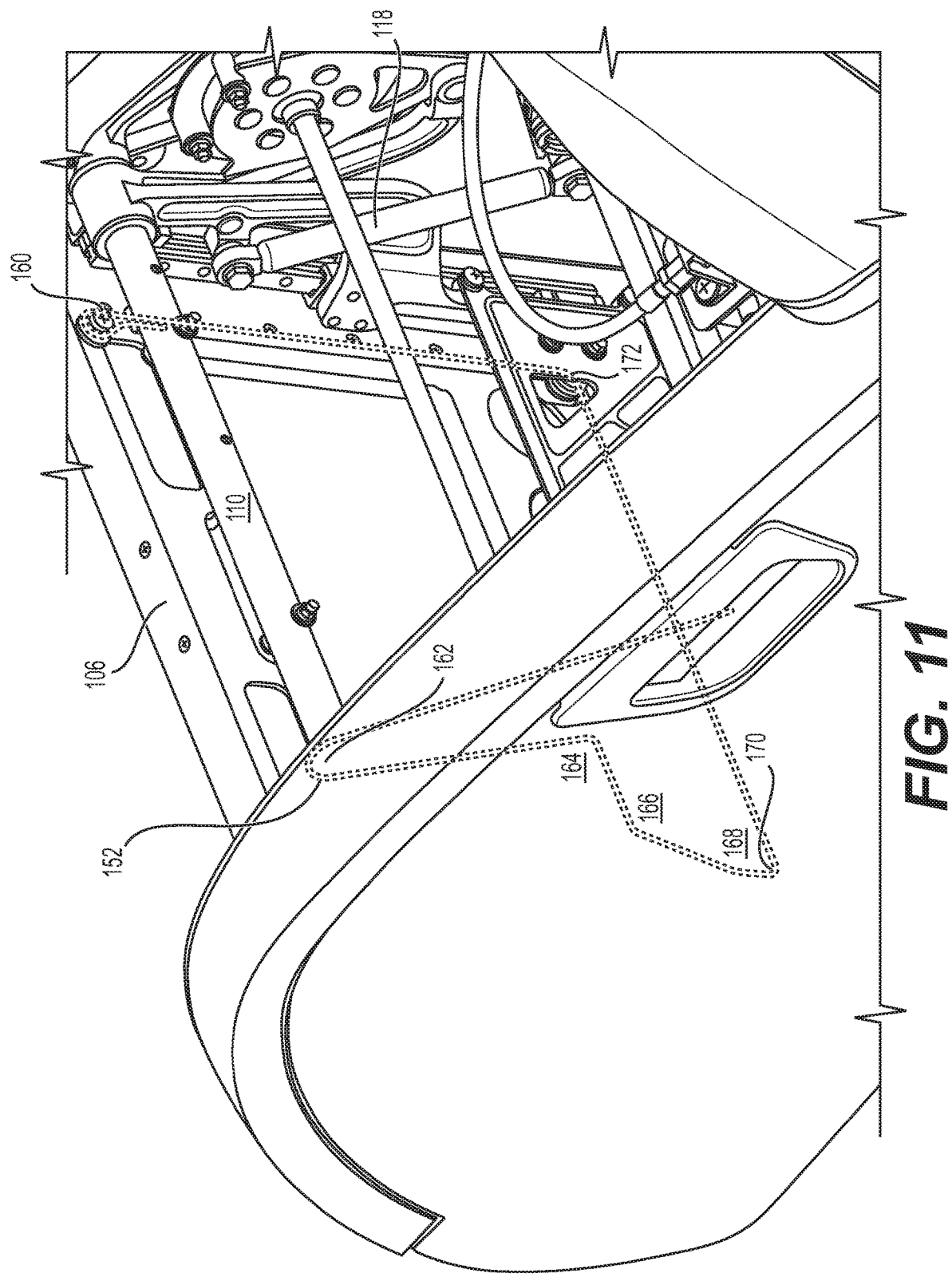
FIG. 11 is a view of the chair wherein the travel details for the first cable 152 are revealed.
Figure 12:
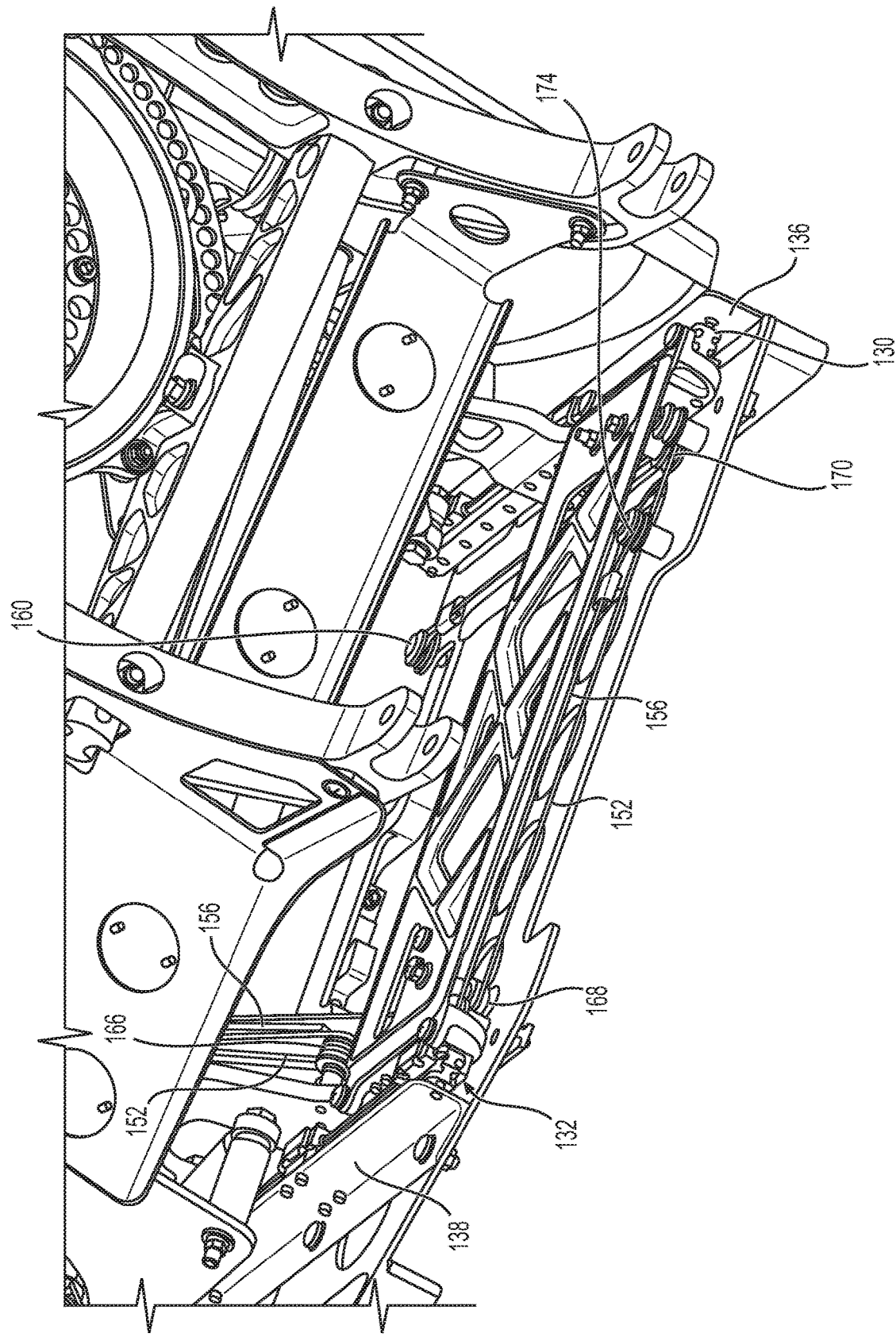
FIG. 12 is a bottom view looking at the back (or inside) of the footrest from bottom-left to top-right, revealing further details at the chair/footrest interface.
Figure 13:
FIG. 13 is a perspective view of the chair and footrest wherein the footrest is deployed.
Figure 14:
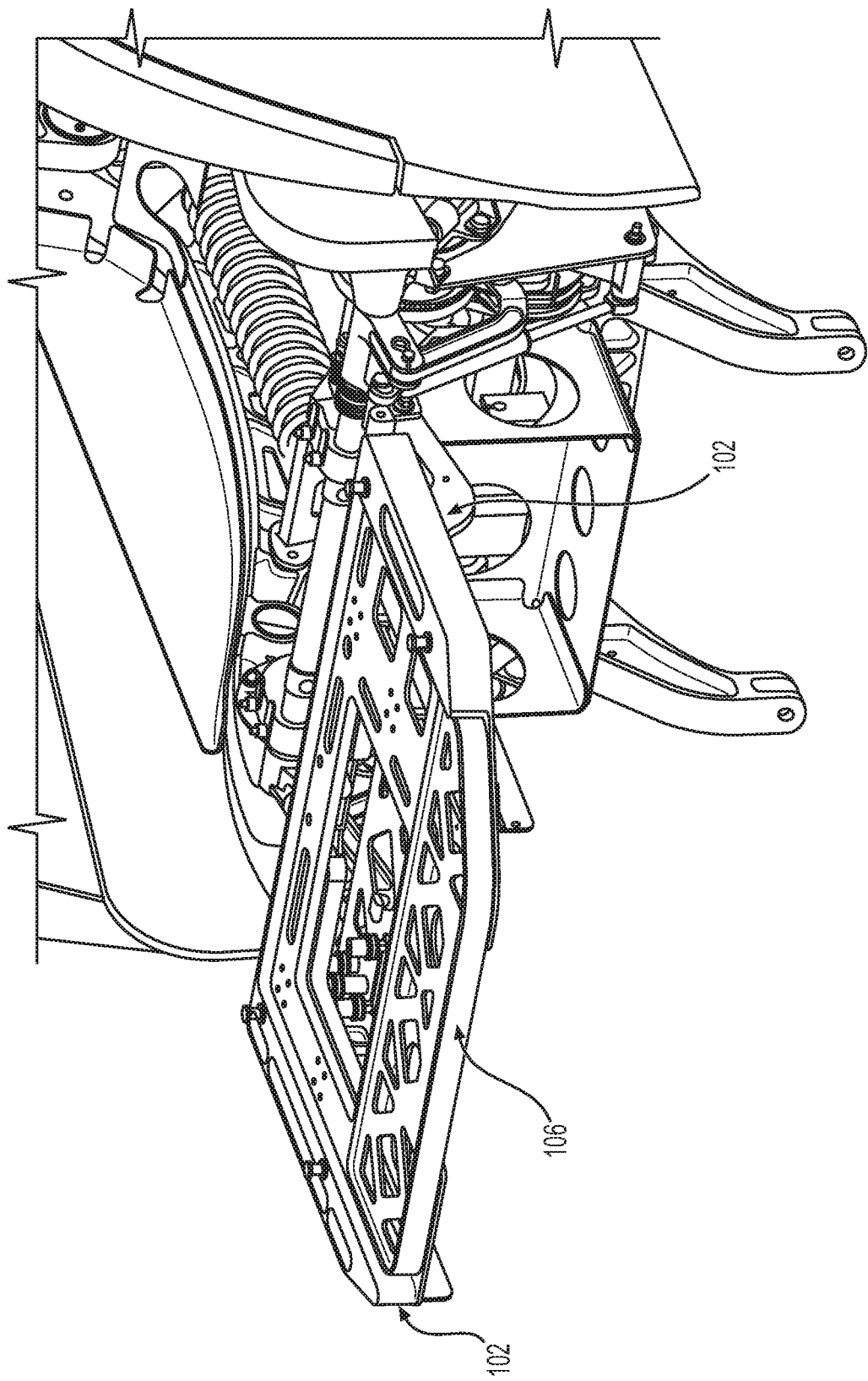
FIG. 14 is a closeup view of the footrest in deployed position revealing the internals.

A spool-driving subsystem uses a master slave relationship to impart rotation of the axis 100 to spool 146. More specifically, the spool 146 is driven—either in clockwise, or counter-clockwise directions, when the support member 102 rotates about the axle 110. There is a linking member 150. Referring to FIG. 9, the linking member 150 is driven by rotation of the support member 102. Collar 114, which is in fixed relation with member 102, rotates on the axle 110 during a retraction or a deployment. The linking member 150 is bolted onto the sprocket 152, and includes an outwardly-extending arm 186 (see FIG. 9) which is hingably connected between prongs 158 on the collar 114. Because of this arrangement, upon rotation of the collar 114 during a deployment, the prongs 158 rotate out and up putting arm 186 in tension. Arm 186 pulls tangentially on linking member 150, putting it into counter-clockwise rotation, thus creating the same rotation into sprocket 152 to which the linking member 150 is fixed. Sprocket 152, thus rotating on sprocket axle 154, drives a timing belt 156. The belt 156 is connected with and imparts rotation from the sprocket 152 to the spool 146. Thus, deployment of the support member 102 (and thus, footrest) up and out indirectly rotates the spool 146 in a first direction, and the rotation of the footrest back into a stowed position rotates the spool in an opposite second direction. The spool rotations will be used to drive the translation of the extension member 106 outward as the footrest is deployed (as can be seen in FIGS. 13 and 14).

Although the embodiment depicted in the figures shows the use of a three axis design comprising: (i) the hinge axis (at center of axle 110), (ii) the sprocket axis 154, and (iii) the spool axis 148, alternative arrangements are possible which include even more axes imparting the rotation from axle 110 as the master, and spool axis 153 as the slave. Further, a two axis arrangement is also possible where the axle 110 directly imparts rotation to the spool 146 on the spool axis 148.

It will now be explained how the rotation of the spool creates the translation in and out of the footrest. When the footrest is released from stowed position (by unlatching as discussed above), tension created in cable 152 is used to translate the footrest out while it is rotating. A first end (not shown) of cable 152 is secured on the spool 146 and then wound in the first channel 150 in a direction such that when the spool 146 rotates in a counter-clockwise direction, it is in tension, and spooled. The second end 158 of the cable 152 is fixed to an outer location on the extension member using an anchor 160. Between the spool 146 and the anchor 160, the first cable 152 is looped through a series of redirecting pullies and other devices as can be seen in FIGS. 4 and 6-12. More specifically, cable 152 first passes over roller bearing 162 (FIG. 7), extends down to and underneath a fixed pulley 164, extends further down and over a fixed pulley 166, then (see FIG. 12) further down and looped over a pulley 168 which feeds the cable into a transversely-oriented pulley 170, then across to and under pulley 172, and then terminates in anchor 160.

As discussed above, the deployment of footrest out and up will result in the rotation of axis 110, which, consequently rotates spool 146 in a counter-clockwise direction, which pulls cable 152 in. This imparts outward force to anchor 160, and thus, extension member 106 is extended out with the footrest cushion on top of it for use by a passenger.

Because it is wound around the spool in a direction opposite the first cable 152, tension in the second cable 156 is simultaneously reduced when the spool operates in a counter-clockwise direction. Thus, while first cable 152 is being unwound, second cable 156 is being wound around the spool at the same rate (since both cables are at the same distance from the center of the spool axis).

Figure 8:
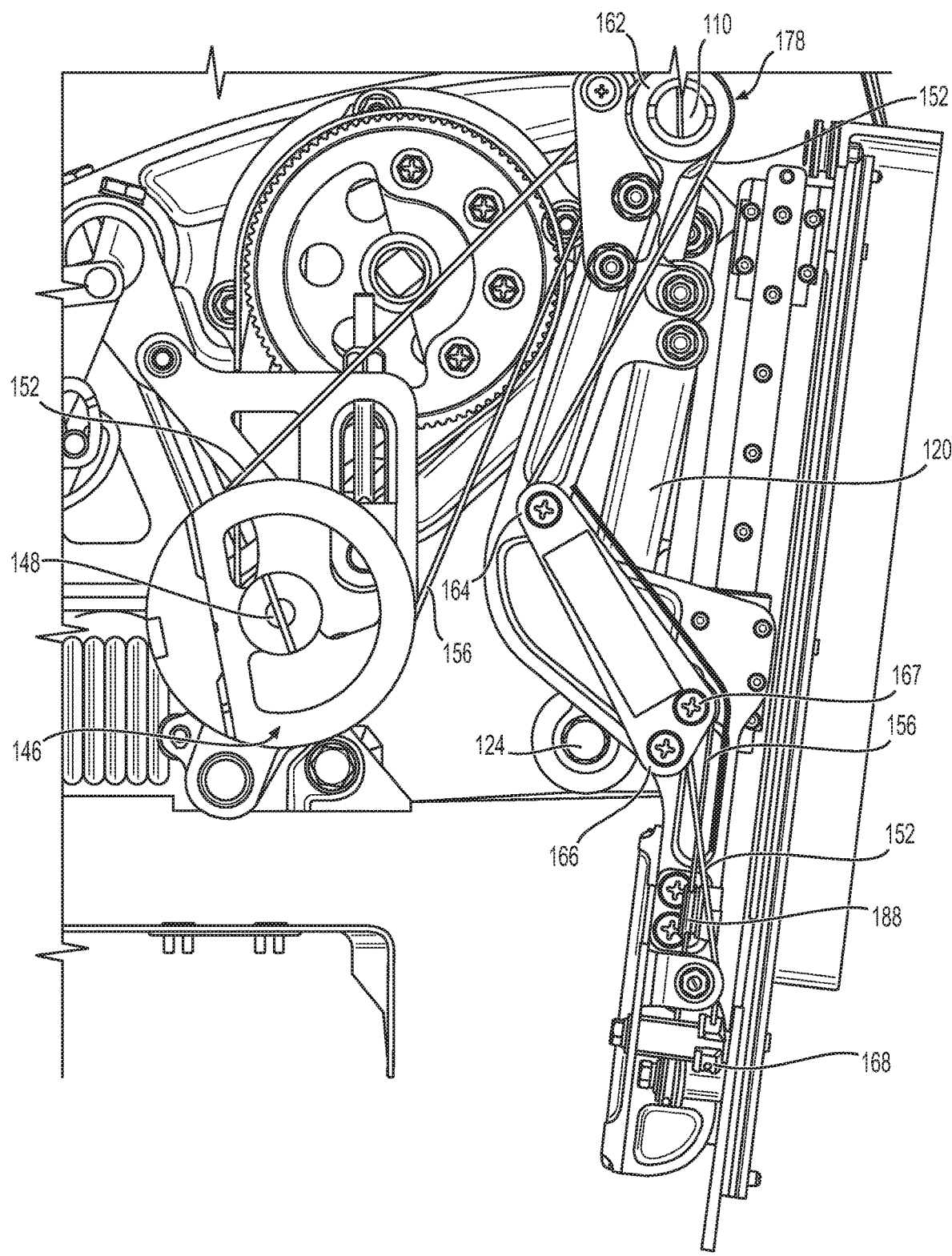
FIG. 8 is a side view of the spool arrangement of the system.

When a user's legs push down on the footrest to return it to stowed position, the axle 110 will be rotated in the opposite/clockwise direction. This results in greater tension being created in the second cable 156, whereas the tension in the first cable 152 is laxed. A first end (not shown) of the second cable 156 is fixed in the second channel 154 of the spool. The second cable 156 is wrapped clockwise on the spool. It is wound in the second channel 154 in a direction such that when the spool 146 rotates in a clockwise direction, it is in tension, and spooled. The second end 158 of the cable 156 is fixed to an outer location on the extension member 106 using an anchor 176. But between the spool 146 and anchor 176, the second cable 156 is looped through a second series of redirecting pullies and other devices, including devices 178, 164, 167, and 188, in a manner similar to what was arranged for the first cable 152. More specifically, from the spool 146, the second cable 156 travels over a tandem roller bearing 178 which exists on axle 110. The roller bearing 178 defines a channel 163 that receives cable 156. The portions of the roller bearing 178 supporting channels 162 and 163 rotate independently. Thus, the two cables are not mechanically linked at this point. From there, the second cable 156 is directed down to another separately rotating portion of pully 164. Referring to FIG. 8, the reason cable 156 cannot be seen upon encountering pully 164 is because cable 156 is directly behind cable 152 when viewed in cross-section. From pully 164, cable 156 splits (looking at the FIG. 8 cross-section) and travels to and over a pully 167. From pully 167, cable 156 encounters a transversely-directing pully 188 and finally terminates at the anchor 176.

In a retraction of the footrest, the increased tension in second cable 156 results in a force being imparted to fixed pully 188, pulling the extension member inward so that it is retracted. The fixed anchor 176 along with the tension in the second cable 156 creates a lasso effect with respect to the pully 188. Thus, the cushion supporting extension member 106 is retracted.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system of comprising:
   a footrest attached to the front of a chair using a hinge arrangement;
   the hinge arrangement including at least one rotating collar on one of the chair or the footrest that rotates about an axle located on the other of the chair and footrest;
   a mechanical linking system connected to the rotating collar, the linking system imparting rotation into a spool in a first imparted angular rotation direction when the footrest is pushed down towards a retracted position, the linking system imparting rotation into the spool in a second angular direction when the footrest is raised up towards a deployed position;
   a first cable wound in a first direction onto the spool, a first circumferential groove being formed into an outer surface of the spool to a first depth, the first cable being received into the first groove;
   a second cable wound onto the spool in a second direction, the second direction being, opposite of the first direction such that the second cable releases in substantially the same amount when the first cable retracts, a second circumferential groove formed into the outer surface of the spool at a second depth, the second cable being received into the second groove;
   depths for each of the first and second grooves being established such that they each are at substantially equal radial distances from a center axis of the spool;
   the first cable being connected to a first location of a translational member, the second cable being connected to a second location on the translational member such that when the footrest is deployed the translational member extends outward, and when the footrest is retracted, the translational member is drawn inward.

2. A system comprising:
   a footrest attached to the front of a chair using a hinge arrangement;
   the hinge arrangement including at least one rotating collar on one of the chair or the footrest that rotates about an axle located on the other of the chair and footrest;
   a mechanical linking system connected to the rotating collar, the linking, system imparting rotation into a spool in a first imparted angular rotation direction when the footrest is pushed down towards a retracted position, the linking system imparting rotation into the spool in a second annular direction when the footrest is raised up towards a deployed position;
   a first cable wound in a first direction onto the spool;
   a second cable wound onto the spool in a second direction, the second direction being opposite of the first direction such that the second cable releases in substantially the same amount when the first cable retracts;
   the first cable being, connected to a first location of a translational member, the second cable being connected to a second location on the translational member such that when the footrest is deployed the translational member extends outward, and when the footrest is retracted, the translational member is drawn inward;
   wherein the first cable and second cable are configured to move the translational member inward and outward using at least one cable-redirecting subsystem.

3. The system of claim 2 wherein the at least one cable-redirecting subsystem incorporates a plurality of redirecting pulleys.

4. The system of claim 2 comprising a second cable-redirecting system.

5. The system of claim 4 wherein each of the first and second cable-redirecting systems incorporate pulleys to redirect the first and second cables through spaces existing between obstacles.

6. The system of claim 2 wherein the first cable-redirecting, subsystem is configured to cause the first cable to pull the translational member while the second cable is slacked to allow the translation.

7. The system of claim 1 comprising: a frame member which includes at least one collar supports the extension member, the extension member being configured to be translatable relative to the frame member.

8. The system of claim 7 wherein the extension member supports a cushion member, the cushion member positioned to support a portion of a leg of a user.

9. The system of claim 7 wherein the at least one collar comprises a pair of aligned spaced-apart collars.

10. The system of claim 2 wherein the axle is fixed to a frame portion of the chair, and thus, made to be immobile relative to the chair, and the at least one collar supports a footrest frame member which rotates relative to the chair.

11. The system of claim 10 wherein the footrest frame member supports the translatable member, the translatable member and footrest frame member being configured such that the translatable member moves substantially in parallel relative to the footrest frame member.

12. The system of claim 11 wherein the translatable member is located on top of the footrest frame member, and the translatable member supports a cushion.

13. The system of claim 12 wherein the translatable member slide direction is dictated by opposing guide members.

14. The system of claim 13 wherein the opposing guide members comprise aide bearings.

15. A system comprising:
   a footrest attached to the front of a chair using a hinge arrangement;
   the hinge arrangement including at least one rotating collar on one of the chair or the footrest that rotates about an axle located on the other of the chair and footrest;
   a mechanical linking system connected to the rotating collar, the linking system imparting rotation into a spool in a first imparted angular rotation direction when the footrest is pushed down towards a retracted position, the linking system imparting rotation into the spool in a second angular direction when the footrest is raised up towards a deployed position;
   a first cable wound in a first direction onto the spool;
   a second cable wound onto the spool in a second direction, the second direction being opposite of the first direction such that the second cable releases in substantially the same amount when the first cable retracts;
   the first cable being connected to a first location of a translational member, the second cable being connected to a second location on the translational member such that when the footrest is deployed the translational member extends outward, and when the footrest is retracted, the translational member is drawn inward;
   the mechanical linking system including a linking member driven by at least one outwardly-extending prong on the collar, the prong rotating along with the collar and pulling on a linking arm, the linking arm, as a result pulling tangentially on a sprocket, the rotation of the sprocket resulting in the driving of a timing belt, the belt imparting rotation to the spool.

* * * * *